United States Patent [19]

Griffo et al.

[11] 4,091,925

[45] May 30, 1978

[54] SNAG RESISTANT VENTED FLOWER SLEEVE

[75] Inventors: Gregory Griffo, San Dimas; Raymond H. Sanders, Alta Loma, both of Calif.

[73] Assignee: Standun, Inc., Compton, Calif.

[21] Appl. No.: 824,643

[22] Filed: Aug. 15, 1977

[51] Int. Cl.² .................... A01G 5/00; A47G 7/02; B65B 1/04; B65D 65/04; B65D 75/02; B65D 85/52

[52] U.S. Cl. .................... 206/423; 47/41 R; 53/35; 229/87 P; 229/DIG. 3

[58] Field of Search ............ 47/30, 34, 41; 53/35; 206/423, 554; 229/87 P, 53, 89, DIG. 3, DIG. 14

[56] References Cited

U.S. PATENT DOCUMENTS

| | | | |
|---|---|---|---|
| 3,040,966 | 6/1962 | Crane | 229/53 X |
| 3,245,606 | 4/1966 | Crane | 229/53 |
| 3,376,666 | 4/1968 | Leonard | 229/87 P X |
| 3,556,389 | 1/1971 | Gregoire | 229/87 P X |
| 3,987,583 | 10/1976 | Takeyasu | 206/423 X |

FOREIGN PATENT DOCUMENTS 2,501,691 7/1976 Germany .................... 206/423

*Primary Examiner*—Steven E. Lipman
*Attorney, Agent, or Firm*—Mahoney, Schick & Cislo

[57] ABSTRACT

A preferably plastic film flower sleeve has side edge heat sealed front and back panels tapering inwardly in downward extension providing upper and lower open ends. Each panel has a centralized nonperforated area which increases progressively in transverse width during its downward progression bordered by transversely opposite perforated groups decreasing correspondingly in transverse width during downward progression, the perforated groups also being defined by nonperforated upper and lower end portions. A flower sleeve may be rearwardly rack suspended and forwardly hand suspended during insertion of a flower bunch downwardly therein, the flower bunch stems being maintained forwardly aligned with the progressively increasing nonperforated areas to avoid snagging and the stems ultimately projecting from the sleeve lower end while the increased size flowers of the bunch automatically transversely expand the sleeve perforated groups.

25 Claims, 9 Drawing Figures

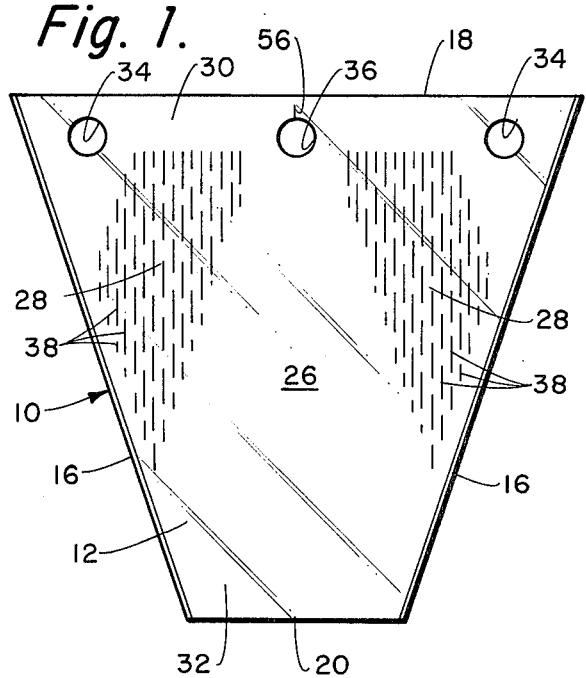
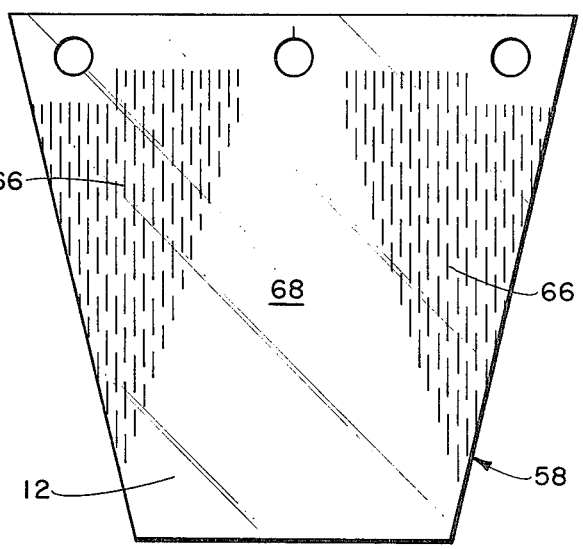
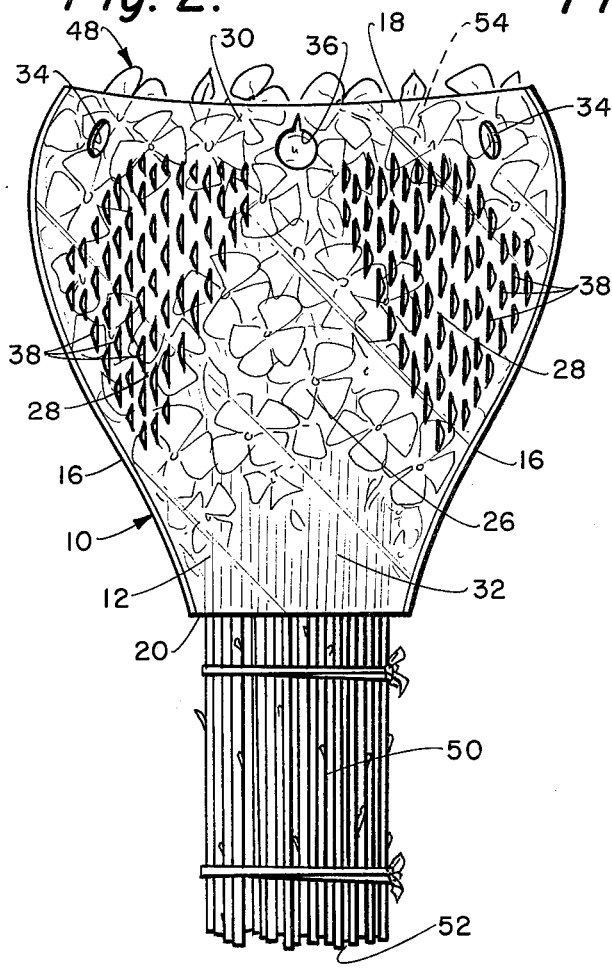
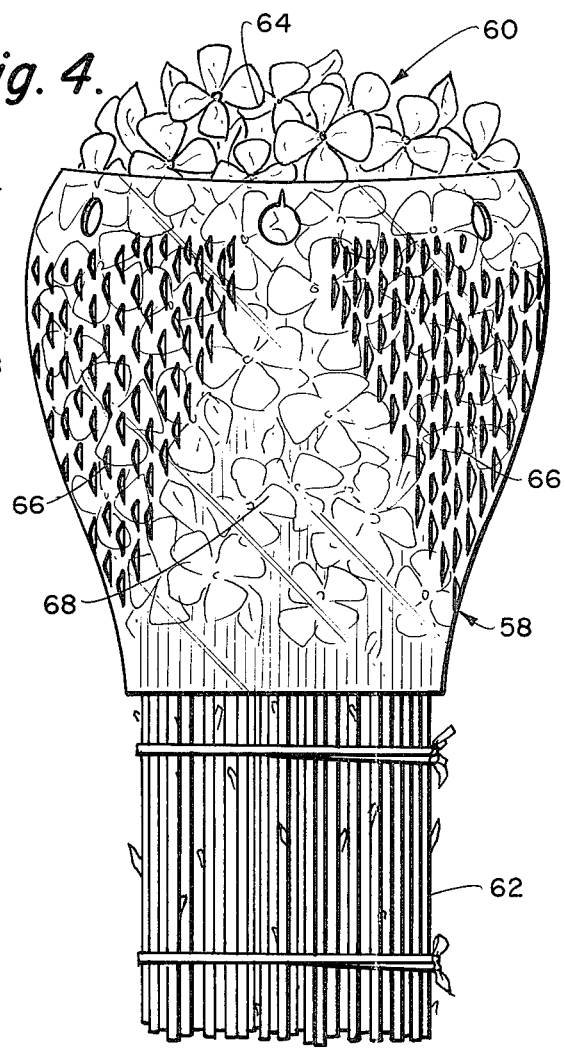

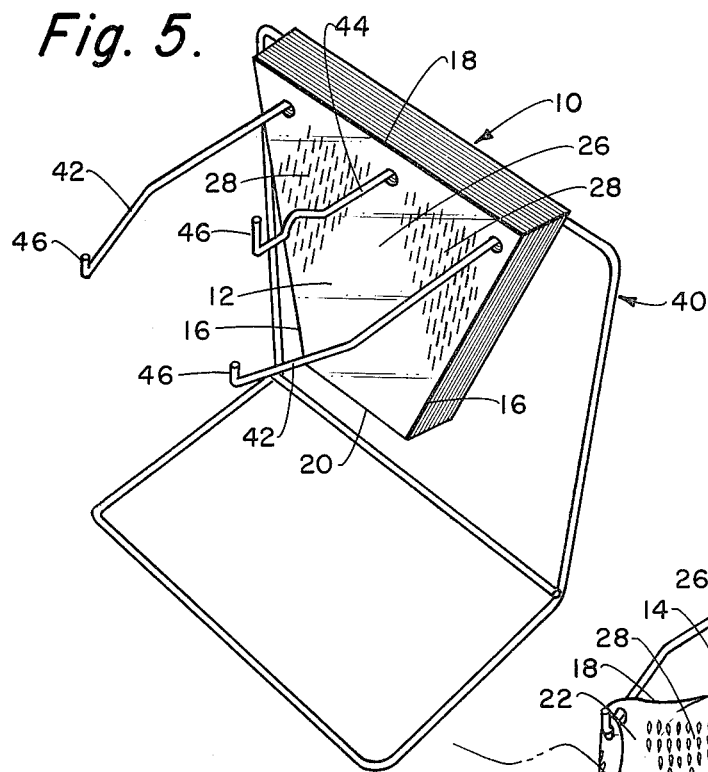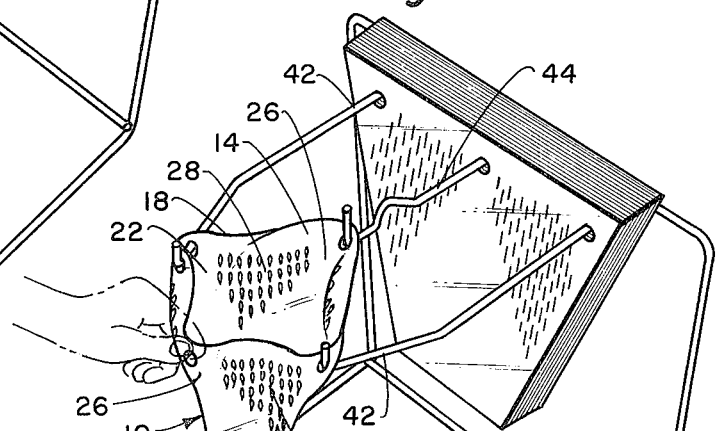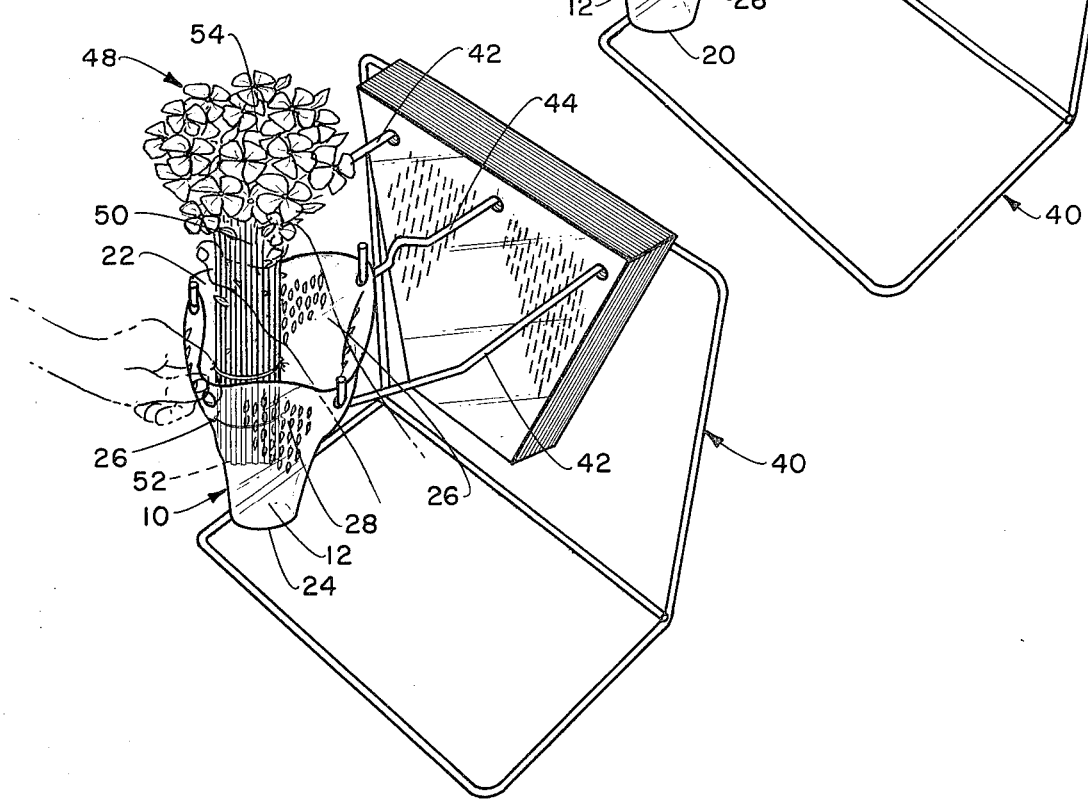

SNAG RESISTANT VENTED FLOWER SLEEVE

BACKGROUND OF THE INVENTION

This invention relates to a flower sleeve adapted for enclosing individual flower bunches, and more particularly, to such a flower sleeve combining the novel features of being both snag resistant during flower bunch installation therein, yet still having the vital venting for the flower bunch after said installation. Due to a novel shape and positioning of a flower sleeve nonperforated area or areas, the flower bunch may be inserted downwardly into the sleeve in the usual manner with a very minimal danger of possible snagging and as the larger size flower portion of a flower bunch enters and is ultimately installed in the sleeve, likewise particularly shaped and positioned perforated groups of the sleeve are forced to automatically expand and thereby provide efficient venting for the installed flower bunch. Furthermore, again in the preferred form, the flower sleeve is very well adapted for efficient suspension of the sleeve prior to and during flower bunch installation providing an overall highly efficient operation for presenting the flower bunch in an aesthetically pleasing marketable form, yet in a positively protected marketable form.

Various forms of wraps and sleeves have heretofore been provided for protecting flower bunches during the marketing thereof. For instance, mere sheets of plain paper or lighter tissue have been used with the flower bunch being rolled therein for transverse covering. However, in order to retain maximum freshness during marketing, flower bunches must be kept moist and the presence of moisture required the paper or tissue to be of at least a partial waterproof nature. In either case, however, it was difficult to maintain the paper sheet covering in place over the flower bunch and the provision of the obviously only minimum venting has made this form of flower bunch covering lacking in desirability.

The next progression of development brought forth flower sleeves and this was particularly true with the advent of the more modern plastic films. Straight tubular sleeves were used having a minimum diameter sufficiently large for receiving and transversely enclosing the larger flower portion of the flower bunches with the lower part of the sleeve gathered inwardly around the downwardly projecting flower stems, all of which created a somewhat bulky package due to the wide varience between the straight sleeves and the contoured bunches. Despite this bulkiness, however, the sleeves were far easier to retain in place over the flower bunches than the prior simple rolled sheet coverings and by use of the various plastic films, the sleeves were unaffected by water sprays used to maintain the flower bunches in a freshened state.

Although this advancement relieves some of the objections to the prior constructions, one difficulty still remaining was that of providing proper venting, the flower bunch only having access to air at the upper open end of the sleeve and otherwise being virtually totally covered. The resulting answer was to provide perforations through the sleeves to permit the circulation of air through such perforations and into and around the sleeve installed flower bunches.

In one form, the perforations may be permanently sized holes spaced throughout the sleeves and in a more advanced form, the perforations may be created by particularly arranged slits which automatically expand open during the installation of the flower bunches within these sleeves. This latter construction is illustrated in a sleeve for packaging various materials in U.S. Pat. No. 3,040,966 issued June 26, 1962 and entitled "ARTICLE PACKAGING SLEEVE".

This initially appears to solve the problem. By forming the sleeves of plastic film, they were not subject to destruction by water so as to permit the presence of the same as vitally required by the flower bunch and the additionally vitally required air was permitted to circulate through the flower bunch by the sleeve perforations. It was quickly found, however, that even though the sleeve perforations were vitally needed, the installation of the same presented a surface which was extremely subject to being snagged by the stems of the flower bunch during insertion downwardly into the flower sleeves or the drawing of the flower sleeves upwardly over the flower bunch for installation.

More specifically, whether a flower bunch is installed in a flower sleeve by insertion of the flower bunch, stem first, downwardly into the flower sleeve, or the flower sleeve is drawn upwardly over the stems and ultimately over the flowers of the flower bunch for such installation, a distinct snagging situation is presented. The stems of most flower bunches are somewhat irregular, in certain cases even very irregular depending on the type of flowers making up the flower bunch. Thus, with the walls of the flower sleeve being covered with perforations of one type or another, extreme problems of snagging are inevitable.

OBJECTS AND SUMMARY OF THE INVENTION

It is, therefore, an object of this invention to provide a flower sleeve which is snag resistant during installation of a flower bunch therein, yet is formed with an adequate supply of perforations to provide more than sufficient venting for the flower bunch after such installation. The snag resistance for the flower sleeve is formed by a particular pattern of a nonperforated area or areas in the sleeve wall and a corresponding and cooperating particular pattern of perforation groups bordering the nonperforated area or areas. Thus, by proper positioning and maintenance of the flower sleeve relative to the stems of the flower bunch during insertion therein, any contact between the flower bunch stems and the sleeve will be at the nonperforated area or areas and will always be adjacent and free of the perforation groups, thereby automatically supplying snag resistance.

In a preferred form, the flower sleeve has at least one nonperforated area which progressively increases in transverse width downwardly between an upper open end and a lower open end. This nonperforated area of such unique pattern is bordered at opposite transverse sides by adjacent perforation groups which correspondingly conform in pattern to the nonperforated area transverse extension. During installation of the flower bunch, therefore, it is only necessary to insert the stem ends of the flower bunch downwardly into the sleeve upper end and through and from the sleeve lower end while maintaining the flower bunch stems aligned with the nonperforated area and always adjacent the perforation groups so that any contact of the stem ends or stems with the flower sleeve will always be at the nonperforated area and snagging problems will be effectively eliminated.

It is a further object of this invention to provide a flower sleeve of the foregoing snag resistant and vented general character which is particularly adapted for a highly efficient method of flower bunch installation therein. By suspending the flower sleeve with the nonperforated area thereof centralized and the perforation groups toward the side edges thereof, it is a simple matter of maintaining the flower bunch stems, and particularly the stem ends thereof, likewise centralized and in alignment with the nonperforated area so that flower bunch installation can be easily carried out with a minimum of skill for the person performing the same. Furthermore, by suspending the uniquely formed flower sleeve engaged rearwardly by rack means and forwardly by hand, all while maintaining the positioning of the nonperforated area centralized, the flower sleeve is firmly positioned and retained with one hand free for the downward insertion of the flower bunch therein resulting in a very efficient, problem-free operation.

Other objects and advantages of the invention will be apparent from the following specification and the accompanying drawings which are for the purpose of illustration only.

BRIEF DESCRIPTION OF THE DRAWINGS

FIG. 1 is a front elevational view of a first preferred embodiment of a flower sleeve incorporating the principles of the present invention;

FIG. 2 is a front elevational view of the flower sleeve of FIG. 1 with a flower bunch installed therein;

FIG. 3 is a second preferred embodiment of a flower sleeve incorporating the principles of the present invention;

FIG. 4 is a front elevational view of the flower sleeve of FIG. 3 with a flower bunch installed therein; and FIGS. 5 through 9 are perspective views showing the first preferred embodiment flower sleeve of FIGS. 1 and 2 supported on an appropriate rack during the carrying out of the appropriate progressive steps for initially preparing one of the flower sleeves, the installation of a flower bunch therein and the final removal of the flower sleeve from the rack.

DESCRIPTION OF THE BEST EMBODIMENTS CONTEMPLATED

Figure 8:
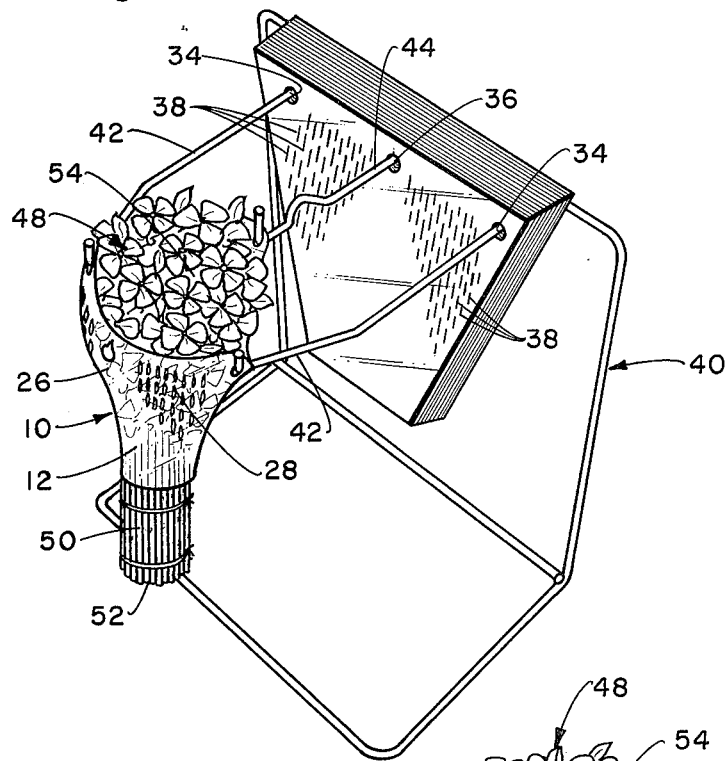

A first preferred embodiment of flower sleeve incorporating the unique snag resistant and venting principles of the present invention is generally indicated at 10 and shown in FIGS. 1, 2 and 5 through 9 of the drawings, the flower sleeve being illustrated in a stored condition prior to use in FIGS. 1 and 5, and in various stages of use in FIGS. 2 and 6 through 9. More specifically, the flower sleeve 10 includes preferably substantially identical front and back flexible panels 12 and 14, each preferably tapering or angling progressively transversely inwardly in downward extent at transversely opposite side edges 16 thereof. In this first embodiment form, the side edges 16 of the front and back panels 12 and 14 are heat seal connected where the materials are compatible to such form of connection, but otherwise could be joined by appropriate adhesives. Upper and lower edges 18 and 20 of the front and back panels 12 and 14 remain unconnected forming sleeve upper and lower open ends 22 and 24 completing the overall general sleeve configuration.

Important to the principles of the present invention, each of the front and back panels 12 and 14 is formed with a preferably transversely centralized nonperforated area 26 which increases progressively in transverse width in its downward extension along the particular panel and this nonperforated area is oppositely transversely bordered by venting perforation groups 28 having transversely inward edges appropriately progressing transversely outwardly in downward extension. The venting perforation groups 28 preferably begin spaced downwardly from the particular panel upper edge 18 and terminate downwardly spaced upwardly from the particular panel lower edge 20 to thereby provide upper and lower nonperforated border portions 30 and 32 the transverse extent of the particular panel. Except in the areas generally transversely approaching permanently sized side rack openings 34, the venting perforation groups 28 of each panel extend transversely outwardly to slightly spaced from the particular panel side edges 16 so that these venting perforation groups will provide relatively large venting areas while still not interfering with the heat sealing or other form of connection of the front and back panel side edges 16. The permanently sized rack openings 34 of each of the panels are located downwardly of the upper nonperforated border portion 30 and spaced preferably uniformly transversely inwardly of the side edges 16 and a similar permanently sized center rack opening 36 is located generally between the venting perforation groups 28 and at the upper termination of the nonperforated area 26 of each of the panels, the purpose of these rack openings to be hereinafter described.

In particular formation of each of the venting perforation groups 28, such groups are formed by a multiplicity of spaced venting perforations 38 and these perforations could be permanently sized perforations (not shown) and would provide adequate internal ventilation for the flower sleeve 10 in many cases. In optimum form, however, it is preferred to provide the venting perforations 38 as a multiplicity of transversely adjacent and upwardly and downwardly extending rows of upwardly and downwardly extending slits, each row of slits being off-set preferably midway of its transversely adjacent rows of slits, all as clearly shown in FIGS. 1 and 5. With this particular slit configuration and positioning, the venting perforations 38 of each of the venting perforation groups 28 is transversely expansible and upwardly and downwardly nonexpansible from pressure, in this case, internal pressure, against or tending to expand the particular panel which will result in these slits transversely opening from such expansion pressure resulting in the opening of the venting perforations 38 as shown in FIGS. 2 and 6 through 9.

In manufacture of the flower sleeves 10, it is preferred to form the same from plastic film, preferably transparent polyethylene plastic film. Polypropylene plastic could be used and would form a clear transparency, the main drawback being that due to its physical characteristics, when the venting perforations 38 are formed, objectionable sharp edges remain. The same would be true of cellophane, that is, greater clarity but objectionable sharp edges. It is for these reasons that polyethylene plastic is preferred.

During manufacture, the preferred method is to simultaneously form the front and back panels 12 and 14 of a flower sleeve 10 from overlying layers of the plastic with the heat sealing of the side edges 16 as hereinbefore described. All of the venting perforations groups 28 and the side and center rack openings 34 and 36 of the front and back panels 12 and 14 may also be simultaneously formed. The overall result is that the resulting flower sleeve 10 has flat front and back panels 12 and 14 which are not only substantially identical, but are forwardly and rearwardly registering of the various elements thereof due to the simultaneous formation of such elements. In this flat state, the flower sleeves 10 are in convenient form for flat storage, both for long term storage and for rack supported storage just prior to use, the latter to be immediately described below.

In the preferred form of use of the flower sleeves 10, a multiplicity of the flat, aligned flower sleeves are mounted on an appropriate rack generally indicated at 40 for storage at a back portion of the rack as shown in FIG. 5. The rack 40 has transversely spaced and aligned elongated side prongs 42 and a reduced center prong 44, the transverse spacing thereof at least at the rack rearward storage part being substantially the same as the transverse spacing of the flower sleeve side and center rack openings 34 and 36 so as to properly accommodate the flower sleeves 10 in such storage. Also, the rack elongated side prongs 42 angle slightly transversely inwardly at their forward portions terminating forwardly in hook-shaped ends 46, the rack reduced center prong 44 also terminating forwardly in a similar hook-shaped end 46.

The flower bunch generally indicated at 48 is readied for packaging by the usual gathering of a multiplicity of stemmed flowers together for forming such bunch. It is preferred to bind stems 50 of the bunch spaced above stem ends 52 at appropriate locations depending on the usual requirements including the lengths and types of the flower stems. The usual flower bunch configuration is thereby provided for the flower bunch 48 including a transversely enlarged upper flower portion 54 and the downwardly projecting lower stems 50 ultimately terminating downwardly in the stem ends 52.

As shown in FIG. 6, in preparation for installing the flower bunch 48 in a flower sleeve 10, a forwardmost of the rack suspended flower sleeves is grasped with one hand, the fingers engaging the flower sleeve front panel 12 generally adjacent the front panel center rack opening 36 and the flower sleeve is slid forwardly along the rack side and center prongs 42 and 44. When the flower sleeve front panel 12 reaches the forward hook-shaped end 46 of the rack center prong 44, the flower sleeve front panel 12 at the center rack opening 36 is removed from the rack center prong either by lifting from the hook-shaped end 46 or by tearing or rupturing the flower sleeve front panel 12 and a rupture cut 56 may be provided in the flower sleeve front panel 12 as shown to aid in this tearing. Continuing in this same movement, the flower sleeve 10 is ultimately positioned with the back panel 14 thereof centrally retained by the hook-shaped end 46 of the rack center prong 44, the flower sleeve oppositely side retained forwardly of the rack center prong by the hook-shaped ends 46 of the rack side prongs 42 and the flower sleeve front panel 12 hand center retained spaced forwardly of the rack side prongs, all as shown in FIG. 6.

Thus, the flower sleeve 10 as shown in FIG. 6 is now positioned rearwardly suspended by the rack 40 and forwardly hand suspended with the upper and lower ends 22 and 24 relatively fully open and ready for the following downward insertion of the flower bunch 48. Most important is the fact that in this suspension, due to the unique particular positioning and configurations of the various flower sleeve elements as hereinbefore described, the nonperforated areas 26 of the flower sleeve front and back panels 12 and 14 are forwardly centralized with the various venting perforation groups 28 positioned toward the flower sleeve opposite side edges 16. Still further, the flower sleeve centralized nonperforated areas 26 begin at minimum transverse width at the panel upper nonperforated border portions 30 and increase progressively in transverse width downwardly toward the lower nonperforated border portion 32.

Next, as shown in FIG. 7, while still forwardly centrally suspending the flower sleeve 10 with the one hand, the stems 50 of the flower bunch 48 at an intermediate portion thereof are grasped by the other hand and the flower bunch stem ends 52 followed by the stems 50 and ultimately the enlarged upper flower portion 54 are inserted downwardly into the flower sleeve 10 through the flower sleeve upper open end 22. It will be noted that with the flower sleeve 10 suspended as described, the many perforations 38 of the venting perforation groups 28 are stretched at least partially open, but during the insertion of the flower bunch stem ends 52 and stems 50 as described, the stem ends and stems are maintained aligned generally with the flower sleeve nonperforated areas 26 and generally transversely between the flower sleeve venting perforation groups 28. This virtually eliminates any possibility of the flower bunch stem ends 52 or stems 50 snagging in any of the venting perforations 38 of the flower sleeve venting perforation groups 20 since if the flower bunch stem ends or stems forwardly or rearwardly contact the flower sleeve 10, such contact will be with the flower sleeve centralized nonperforated areas 26.

Completing the installation of the flower bunch 48 within the flower sleeve 10, as shown in FIG. 8, the flower bunch stem ends 52 and ultimately a portion of the stems 50 exit downwardly from the flower sleeve lower open end 24 while the enlarged upper flower portion 54 of the flower bunch moves nearly fully into the flower sleeve. As this final motion takes place, the enlarged upper flower portion 54 of the flower bunch 48 forces the flower sleeve 10 transversely fully outwardly expanding the flower sleeve venting perforations 38 transversely to their fully opened forms. As hereinbefore pointed out, it is preferred that these venting perforations 38 will be formed automatically transversely expansible by such pressure and nonexpansible in upward and downward directions of the flower sleeve 10, the latter quality preventing downward elongation movement of the flower sleeve which could inhibit flower bunch installation in the flower sleeve.

Figure 9:
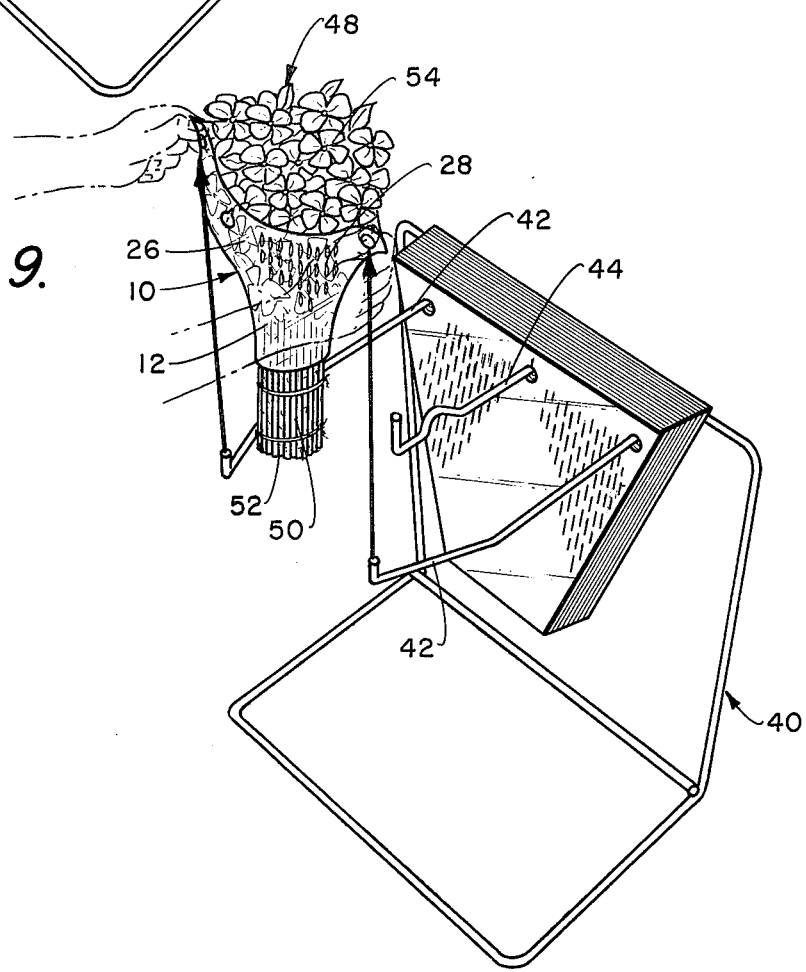

Upon completion of the installation of the flower bunch 48 in the flower sleeve 10, the flower sleeve and flower bunch have been fully released from hand holding and are now fully suspended by the rack 40. The flower sleeve 10 is then hand engaged at both transverse outer upper corners thereof outwardly adjacent the side rack openings 34 and is lifted upwardly to completely disengage from the rack 40 as shown in FIG. 9. This thereby presents a completely assembled flower sleeve 10 and flower bunch 48 as shown in FIG. 2, the installation operation having taken place without difficulty from snagging of the flower bunch stem ends 52 or stems 50 with the flower sleeve venting perforations 38. Furthermore, the final assembly provides the flower sleeve venting perforations 38 fully open, of an adequate number and properly positioned despite the flower sleeve snag resistent characteristic for adequate venting of the installed flower bunch 48 and particularly the flower portion 54 thereof.

A second preferred embodiment of flower sleeve incorporating the principles of the present invention is generally indicated at 58 in FIGS. 3 and 4, FIG. 3 illustrating the flower sleeve in a flat storage condition and FIG. 4 illustrating the same with a flower bunch 60 installed therein. As shown, the flower sleeve 58 is substantially the same in construction as the first embodiment flower sleeve 10 with three exceptions. The first exception is that the flower sleeve 58 is of slightly greater transverse width for accommodating a flower bunch 60 having a larger transverse mass at the stem 62 with the flower portion 64 being approximately the same transverse dimensions. The second and third exceptions are of more consequence.

The second exception is that the flower sleeve 58 is formed of originally downwardly tapered tubular material so that the side edges 16 of the front and back panels 12 and 14 are originally integrally joined and do not require attachment as in the first embodiment flower sleeve 10. The third exception is partially as the result of the second exception in that venting perforation groups 66, different from the venting perforation groups 28 of the first embodiment flower sleeve, may extend entirely transversely outwardly through the front and back panels side edges 16 so as to be continuous between the two panel edges, not having to be interrupted due to fastening of the panel edges. As a more incidental matter, the venting perforation groups 66 may also extend downwardly a greater extent due to the overall increased transverse width of the flower sleeve 58, but these venting perforation groups are preferably still formed in the same manner, that is, with the spaced slit type of venting perforations 38 positioned automatically transversely expansible and upwardly and downwardly nonexpansible as hereinbefore described.

Thus, in this second embodiment flower sleeve 58, the same unique snag resistant concepts are involved as provided by each panel centralized nonperforated area 68 increasing progressively transversely in downward extension bordered by each panel venting perforation groups 66. The flower bunch 60 may be installed in the flower sleeve 58 in substantially the identical manner, whether with the flower sleeve rearwardly rack suspended and forwardly hand suspended or otherwise, the important thing being that the flower bunch may be efficiently installed in the flower sleeve virtually free from snagging problems. Furthermore, in the installed condition as shown in FIG. 4, the flower sleeve 58 will provide slightly greater venting for the flower bunch 60 due to the slightly increased size or overall areas of the venting perforation groups 66 as described.

According to the principles of the present invention, therefore, a flower sleeve construction is provided having the unique attributes of combining snag resistance during flower bunch installation therein with adequate venting for the flowers of the flower bunch after such installation so as to maintain the flower bunch in a fresh state, although conveniently packaged, for the later marketing and sale thereof. Furthermore, this uniquely formed and highly advantageous flower sleeve construction is particularly adapted for the highly efficient method of flower bunch installation therein as hereinbefore described which not only reduces the cost of this flower bunch packaging due to such efficiency capable of accomplishment with minimum worker skill, but takes full advantage of the unique snag resistant qualities of the flower sleeve construction.

It is pointed out that although the unique snag resistant and vented flower sleeve principls of the present invention as to both construction and method have been described herein incorporated in two specific preferred embodiments, it is not intended thereby to limit the principles of the present invention to the specific constructions and method shown. Rather, various material, structural and method alterations from the preferred forms may be made while still advantageously benefiting from the broader inventive principles. In view thereof, the unique principles of the present invention should be broadly construed and particularly as expressed in the appended claims.

We claim:

1. In a flower sleeve adapted for transversely enclosing a flower bunch and the like; the combination of: front and back flexible panels connected at side edges thereof and unconnected at upper and lower edges thereof; a generally transversely centralized and progressively downward transversely increasing nonperforated area in at least one of said panels transversely oppositely bordered by progressively downward transversely decreasing venting perforation groups; whereby, said unperforated area provides a snag resistant area for stems of a flower bunch during downward insertion of said flower bunch therein while said venting perforation groups still provide flower bunch venting after said insertion.

2. In a flower sleeve as defined in claim 1 in which said panels include unperforated portions totally along said upper and lower edges thereof above and below said venting perforation groups.

3. In a flower sleeve as defined in claim 1 in which said venting perforation groups each include automatically expansible slit means operable upon pressure being applied to said flower sleeve.

4. In a flower sleeve as defined in claim 1 in which said venting perforation groups each include automatically transversely outwardly expansible slit means nonexpansible in directions toward said panel upper and lower edges operable upon internal pressures being applied to said panels.

5. In a flower sleeve as defined in claim 1 in which each of said front and back panels have said centralized nonperforation area bordered by said venting perforation groups.

6. In a flower sleeve as defined in claim 1 in which each of said front and back panels is a downward and inward tapered panel between said upper and lower edges thereof.

7. In a flower sleeve as defined in claim 1 in which said panels include unperforated portions totally along said upper and lower edges thereof above and below said venting perforation groups; and in which said venting perforation groups each include automatically transversely outwardly expansible slit means nonexpansible in directions toward said panel upper and lower edges operable upon internal pressures being applied to said panels.

8. In a flower sleeve as defined in claim 1 in which said venting perforation groups each include automatically transversely outwardly expansible slit means nonexpansible in directions toward said panel upper and lower edges operable upon internal pressures being applied to said panels; and in which each of said front and back panels have said centralized nonperforation area bordered by said venting perforation groups.

9. In a flower sleeve as defined in claim 1 in which said panels include unperforated portions totally along said upper and lower edges thereof above and below said venting perforation groups; and in which each of said front and back panels have said centralized nonperforation area bordered by said perforation groups.

10. In a flower sleeve as defined in claim 1 in which said panels include unperforated portions totally along said upper and lower edges thereof above and below said venting perforation groups; in which each of said front and back panels have said centralized nonperforation area bordered by said perforation groups; and in which each of said front and back panels is a downward and inward tapered panel between said upper and lower edges thereof.

11. In a flower sleeve adapted for transversely enclosing a flower bunch and the like; the combination of: front and back flexible panels connected at side edges thereof and unconnected at upper and lower edges thereof; transversely spaced venting perforation groups in at least one of said panels having transversely inward borders defining a nonperforated area transversely therebetween, each perforation group transversely inward border extending progressively transversely outward in downward extension forming said nonperforated area of progressively increasing transverse width in downward extensions; whereby, said nonperforated area provides a snag resistant area for stems of a flower bunch during downward insertion of said flower bunch therein while said venting perforation groups still provide flower bunch venting after said insertion.

12. In a flower sleeve as defined in claim 11 in which each of said front and back panels is unperforated totally transversely along each of said panel upper and lower edges above and below said venting perforation groups.

13. In a flower sleeve as defined in claim 11 in which each of said venting perforation groups includes slit means automatically transversely expansible upon forces being applied against said panels and substantially nonexpansible in direction of said upper and lower edges of said panels.

14. In a flower sleeve as defined in claim 11 in which each of said front and back panels includes said venting perforation groups having said borders defining said nonperforated area.

15. In a flower sleeve as defined in claim 11 in which each of said front and back panels tapers transversely inwardly in downward extension generally from said upper to said lower edges thereof.

16. In a flower sleeve as defined in claim 11 in which each of said front and back panels is unperforated totally transversely along each of said panel upper and lower edges above and below said venting perforation groups; and in which each of said venting perforation groups includes slit means automatically transversely expansible upon forces being applied against said panels and substantially nonexpansible in direction of said upper and lower edges of said panels.

17. In a flower sleeve as defined in claim 11 in which each of said front and back panels is unperforated totally transversely along each of said panel upper and lower edges above and below said venting perforation groups; in which each of said venting perforation groups includes slit means automatically transversely expansible upon forces being applied against said panels and substantially nonexpansible in direction of said upper and lower edges of said panels; in which each of said front and back panels includes said venting perforation groups having said borders defining said nonperforated area; and in which each of said front and back panels tapers transversely inwardly in downward extension generally from said upper to said lower edges thereof.

18. In a method of installing a flower bunch and the like in and transversely enclosed by a flower sleeve; the steps of: providing an upper and lower end opening flower sleeve having a tapered nonperforated part progressively increasing in transverse width in downward extension and transversely oppositely bordered by oppositely tapering venting perforated parts; suspending said sleeve with sleeve ends generally open; inserting stem and portions of a flower bunch downwardly through said sleeve upper end and downwardly through said sleeve end from said sleeve lower end while maintaining said stem end portions generally aligned with said sleeve progressively increasing nonperforated part and generally bordered by said oppositely tapered venting perforated parts; during said stem end portion inserting, locating a remainder of said flower bunch generally in and transversely enclosed by said sleeve.

19. In a method of installing a flower bunch as defined in claim 18 in which said step of suspending said sleeve includes suspending said sleeve with said sleeve progressively increasing nonperforated part generally forwardly centralized and generally forwardly transversely bordered by said venting perforated parts; and in which said step of inserting said stem end portions includes inserting said stem end portions of said flower bunch downwardly through said sleeve upper end and downwardly through said sleeve and from said sleeve lower end while maintaining said stem end portions generally fowardly aligned with said sleeve progressively increasing nonperforated parts and generally forwawrdly bordered by said oppositely tapering venting perforated parts.

20. In a method of installing a flower bunch as defined in claim 18 in which said step of providing said upper and lower end opening flower sleeve includes providing said flower sleeve with said oppositely tapering venting perforated parts automatically transversely expansible; and in which said method includes the step of during said stem end portion inserting, expanding said flower sleeve venting perforated parts transversely.

21. In a method of installing a flower bunch as defined in claim 18 in which said step of providing said upper and lower end opening flower sleeve includes providing said flower sleeve with front and back panels each having said tapered nonperforated part progressively increasing in transverse width in downward extension and transversely oppositely bordered by said oppositely tapering venting perforated parts; and in which said step of suspending said sleeve includes suspending said sleeve with both said front and back panel nonperforated parts forwardly and rearwardly centralized of said panels.

22. In a method of installing a flower bunch as defined in claim 18 in which said step of providing said upper and lower end opening flower sleeve includes providing said flower sleeve with front and back panels each having said tapered nonperforated part progressively increasing in transverse width in downward extension and transversely oppositely bordered by said oppositely tapering venting perforated parts, providing said flower sleeve with said oppositely tapering venting perforated parts of each of said front and back panels automatically transversely expansible; in which said step of suspending said sleeve includes suspending said sleeve with both said front and back panel nonperforated parts forwardly and rearwardly centralized of said panels; and in which said method includes the step of during said stem end portion inserting, expanding said flower sleeve venting perforated parts transversely.

23. In a method of installing a flower bunch as defined in claim 18 in which said step of suspending said sleeve includes suspending said sleeve from rearwardly by rack means and from forwardly by hand while having said sleeve progressively increasing nonperforated part generally forwardly centralized and generally forwardly transversely bordered by said venting perforated parts; and in which said step of inserting said stem end portions includes inserting said stem end portions of said flower bunch downwardly through said sleeve upper end and downwardly through said sleeve and from said sleeve lower end while maintaining said stem end portions generally forwardly aligned with said sleeve progressively increasing nonperforated part and generally forwardly bordered by said oppositely tapering venting perforated parts.

24. In a method of installing a flower bunch as defined in claim 18 in which said step of providing said upper and lower end opening flower sleeve includes providing said flower sleeve with front and back panels each having said tapered nonperforated part progressively increasing in transverse width and downward extension and transversely oppositely bordered by said oppositely tapering venting perforated parts; in which said step of suspending said sleeve includes suspending said sleeve from rearwardly by rack means and from forwardly by hand while positioning said sleeve front and back progressively increasing nonperforated parts generally forwardly centralized and generally forwardly transversely bordered by said venting perforated parts; and in which said step of inserting said stem end portions includes inserting said stem end portions of said flower bunch downwardly through said sleeve upper end and downwardly through said sleeve and from said sleeve lower end while maintaining said stem end portions generally forwardly and rearwardly aligned with said sleeve front and back panel progressively increasing nonperforated parts and generally forwardly and rearwardly bordered by said front and back panels oppositely tapering venting perforated parts.

25. In a method of installing a flower bunch as defined in claim 18 in which said step of providing said upper and lower end opening flower sleeve includes providing said flower sleeve with front and back panels each having said tapered nonperforated part progressively increasing in transverse width in downward extension and transversely oppositely bordered by said oppositely tapering venting perforated parts, providing said flower sleeve front and back panel oppositely tapering venting perforated parts each automatically transversely expansible; in which said step of suspending said sleeve includes suspending said sleeve from rearwardly by rack means and from forwardly by hand while maintaining said sleeve front and back panel progressively increasing nonperforated parts generally forwardly and rearwardly centralized and generally forwardly and rearwardly transversely bordered by said venting perforated parts; in which said step of inserting said stem end portions includes inserting said stem end portions of said flower bunch downwardly through said sleeve upper end and downwardly through said sleeve and from said sleeve lower end while maintaining said stem end portions generally forwardly and rearwardly aligned with said sleeve front and back panel progressively increasing nonperforated parts and generally forwardly and rearwardly bordered by said front and back panel oppositely tapering venting perforated parts; and in which said method includes the step of during said stem end portion inserting, expanding said flower sleeve front and back panel venting perforated parts transversely.

* * * * *